(12) United States Patent
Zhang et al.

(10) Patent No.: US 11,042,795 B2
(45) Date of Patent: Jun. 22, 2021

(54) SPARSE NEUROMORPHIC PROCESSOR

(71) Applicant: The Regents of the University of Michigan, Ann Arbor, MI (US)

(72) Inventors: Zhengya Zhang, Ann Arbor, MI (US); Chester Liu, Ann Arbor, MI (US); Phil Knag, Portland, OR (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 996 days.

(21) Appl. No.: 15/621,797

(22) Filed: Jun. 13, 2017

(65) Prior Publication Data

US 2017/0357889 A1 Dec. 14, 2017

Related U.S. Application Data

(60) Provisional application No. 62/349,445, filed on Jun. 13, 2016.

(51) Int. Cl.
*G06N 3/02* (2006.01)
*G06F 9/50* (2006.01)
*G06F 1/3293* (2019.01)
*G06N 3/063* (2006.01)
*G06N 3/08* (2006.01)
(Continued)

(52) U.S. Cl.
CPC ............ *G06N 3/02* (2013.01); *G06F 1/3293* (2013.01); *G06F 9/505* (2013.01); *G06N 3/0454* (2013.01); *G06N 3/0472* (2013.01); *G06N 3/063* (2013.01); *G06N 3/088* (2013.01); *G06N 20/10* (2019.01); *G06F 9/5094* (2013.01); *Y02D 10/00* (2018.01); *Y02D 30/50* (2020.08)

(58) Field of Classification Search
None
See application file for complete search history.

(56) References Cited

U.S. PATENT DOCUMENTS

2017/0249739 A1* 8/2017 Kallenberg .......... G06K 9/4628

OTHER PUBLICATIONS

Niu et al., "A novel hybrid CNN-SVM classifier for recognizing handwritten digits", Jun. 2011, Elsevier Ltd, all pages (Year: 2011).*

(Continued)

*Primary Examiner* — Daniel C Puentes
(74) *Attorney, Agent, or Firm* — Reising Ethington P.C.

(57) ABSTRACT

An information processor is provided that includes an inference module configured to extract a subset of data from information in an input and a classification module configured to classify the information in the input based on the extracted data. The inference module includes a first plurality of convolvers acting in parallel to apply each of N1 convolution kernels to each of N2 portions of the input image in order to generate an interim sparse representation of the input and a second plurality of convolvers acting in parallel to apply each of N3 convolution kernels to each of N4 portions of the interim sparse representation to generate a final sparse representation containing the extracted data. In order to take advantage of sparsity in the interim sparse representation, N3 is greater than N4 to parallelize processing in a non-sparse dimension and/or the second plurality of convolvers comprise sparse convolvers.

20 Claims, 8 Drawing Sheets

(51) Int. Cl.
G06N 3/04 (2006.01)
G06N 20/10 (2019.01)

(56) References Cited

OTHER PUBLICATIONS

Liu et al., "Sparse Convolutional Neural Networks", 2015, IEEE Xplore, all pages (Year: 2015).*
Wikipedia entry for "Convolutional Neural Network", Wikipedia.org, accessed Mar. 2016, all pages (Year: 2016).*
Various authors, "Sparse Matrix", 2014, Wikipedia, all pages (Year: 2014).*
Author undisclosed, "scipy.sparse.coo_matrix", SciPy.org, all pages (Year: 2016).*

* cited by examiner

| Reference | This Work | | ISSCC'15 Park [2] | ISSCC'14 Lu [3] |
|---|---|---|---|---|
| Application | Object recognition | | Big data analysis | Pattern recognition |
| Function | Deep neural network | | Deep neural Network | Unsupervised online clustering |
| Technology | 40nm | | 65nm | 0.13μm |
| Area | 1.4mm² | | 10.0mm² | 0.36mm² |
| Voltage | 0.9V | 0.65V | 1.2V | 3V |
| Frequency | 240MHz | 120MHz | 200MHz | 8.3kHz |
| Performance | 898.2GOPS | 449.1GOPS | 411.3GOPS | 0.012GOPS |
| Power | 140.9mW | 40.9mW | 213.1mW | 11.4μW |
| Power Efficiency | 6.37TOPS/W | 10.98TOPS/W | 1.93TOPS/W | 1.04TOPS/W |
| Area Efficiency | 641.6GOPS/mm² | 320.8GOPS/mm² | 41.13GOPS/mm² | 0.03GOPS/mm² |

* Performance, power efficiency, and area efficiency of this work are based on effective number of operations

FIG. 9

SPARSE NEUROMORPHIC PROCESSOR

This invention was made with government support under HR0011-13-2-0015 awarded by the Department of Defense (Defense Advanced Research Projects Agency). The government has certain rights in the invention.

BACKGROUND a. Technical Field

This disclosure relates to a processor for classifying information in an input. In particular, this disclosure relates to a processor that takes advantage of the concept of sparsity to reduce processor workloads and power consumption.

b. Background Art

Deep learning is a powerful technique used to analyze large amounts of data by implementing artificial neural networks in machines that are inspired by the operation of biological neural networks such as the brain. Conventional deep learning algorithms such as a convolutional deep belief network rely on filtering an input using multiple layers of specialized kernels for detection and classification of objects or other information in the input. These powerful algorithms demand intense computational resources for use in practical applications because the input is often high in dimensionality, and the number of kernels and the kernel size must be sufficiently large. Further, the computational intensity and required memory size increase even further as the depth of the network increases.

One aspect of biological neural networks that has the potential to reduce workloads, required computational resources and power is the concept of sparsity. Sparsity is a brain-inspired property. Of the billions of neurons that the brain contains, only a handful of them are firing at any given time. Sparsity is an important factor behind the ultra-high energy efficiency of the brain. Physiological evidence indicates that the brain uses a sparse representation to encode sensory inputs. Implementation of sparsity in machine learning has the potential to enable significant reductions in computational complexity and workload and enable significant power dissipation. Sparsity has also been shown to learn better features for classification. Conventional processors, however, either fail to make use of sparsity or fail to take full advantage of the potential use of sparsity.

The inventors herein have recognized a need for an information processor that will minimize and/or eliminate one or more of the above-identified deficiencies.

SUMMARY

This disclosure relates to a processor for classifying information in an input. In particular, this disclosure relates to a processor that take advantage of the concept of sparsity to reduce processor workloads and power consumption.

An information processor in accordance with one embodiment includes an inference module configured to extract a subset of data from information contained in an input and a classification module configured to classify the information in the input based on the extracted subset of data. The inference modules includes a first submodule having a first plurality of convolvers acting in parallel to apply each of N1 convolution kernels to each of N2 portions of the input, wherein N1 and N2 are each greater than one. The first submodule generates at least one interim sparse representation of the input. The inference module further includes a second submodule having a second plurality of convolvers acting in parallel to apply each of N3 convolution kernels to each of N4 portions of the at least one interim sparse representation, wherein N3 is greater than one and greater than N4. The second submodule generates at least one final sparse representation of the input containing the extracted subset of data.

An information processor in accordance with another embodiment includes an inference module configured to extract a subset of data from information contained in an input and a classification module configured to classify the information in the input based on the extracted subset of data. The inference module includes a first submodule having a first plurality of convolvers acting in parallel to apply each of N1 convolution kernels to each of N2 portions of the input, wherein N1 and N2 are each greater than one. The first submodule generates at least one interim sparse representation of the input. The interim sparse representation comprises a two dimensional data structure having a plurality of cells. The inference module further includes a second submodule having a second plurality of convolvers acting in parallel to apply each of N3 convolution kernels to each of N4 portions of the at least one interim sparse representation, wherein N3 is greater than one. Each of the N3 convolution kernels comprises a two dimensional data structure including a plurality of cells. The second submodule generates at least one final sparse representation of the input containing the extracted subset of data. Each of the second plurality of convolvers applies a row of cells of a corresponding convolution kernel to an individual cell of the interim sparse representation to obtain a plurality of intermediate values with the row selected based on a row address of the individual cell of the interim sparse representation.

An information processor in accordance with one or more of the embodiments described herein is advantageous relative to conventional processors because the disclosed processors are configured to take advantage of sparsity in data. In some embodiments, parallel processing is optimized in non-sparse dimensions to reduce workloads and increase efficiency. In other embodiments, sparse convolvers are used that reduce computational needs and further increase efficiency.

The foregoing and other aspects, features, details, utilities, and advantages of the invention will be apparent from reading the following detailed description and claims, and from reviewing the accompanying drawings illustrating features of this invention by way of example.

DETAILED DESCRIPTION

Figure 1:
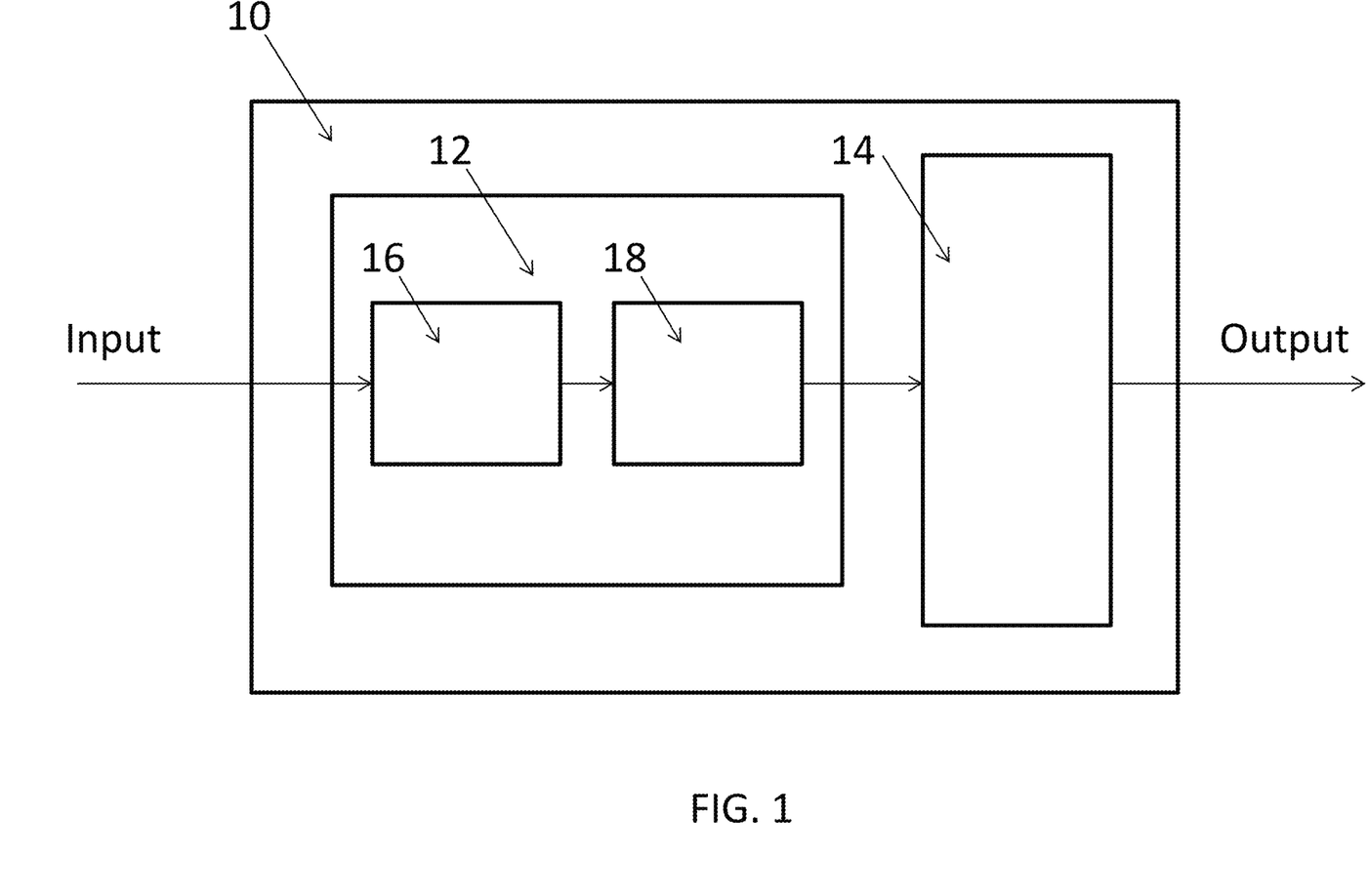
FIG. 1 is a schematic drawing of an information processor in accordance with one embodiment of the present teachings.

Referring now to the drawings wherein like reference numerals are used to identify identical components in the various views, FIG. 1 illustrates an information processor 10 in accordance with one embodiment of the present invention. Processor 10 may comprise a programmable microprocessor or microcontroller or may comprise an application specific integrated circuit (ASIC). Processor 10 may include a central processing unit (CPU) and memory and may also include an input/output (I/O) interface through which may receive a plurality of input signals and transmit a plurality of output signals. Processor 10 may be configured with appropriate programming instructions (i.e. software) to identify and/or classify information within an input. The input may take a variety of forms. In one embodiment, the input may comprise a still image or video from which an object is identified and/or classified for use in various applications including facial recognition. In another embodiment, the input may comprise an audio file from which words or speech patterns are identified for use in speech recognition. It should be understood, however, that processor 10 may find use in a variety of fields in which it is necessary to identify and/or classify information within input data including, for example, data mining, autonomous navigation and human-machine interfaces. In one embodiment, processor 10 is implemented in a single-chip architecture (e.g., a "system-on-a-chip"). Further, in one constructed embodiment, processor 10 is implemented as 40 nm complementary metal-oxide-semiconductor (CMOS) with a size of 1.40 mm². Processor 10 may include inference module 12 and a classification module 14. It should be understood that modules 12, 14 are characterized herein by their functional relationship and the use of the term modules does not necessarily imply a particular physical relationship on a chip or circuit board. It should also be understood that the term "module" as used herein refers to a portion of processor 10 containing specific hardware elements that may or may not include programmable hardware elements (i.e., those that are controlled through software).

Inference module 12 is configured to extract a subset of data from information contained in an input such as an input image. In one embodiment, module 12 implements a two-layer convolutional restricted Boltzmann machine and, in particular, a convolutional deep belief network trained with sparsity regularization as described, for example, in Lee et al., "Unsupervised Learning of Hierarchical Representations With Convolutional Deep Belief Networks," 54 Communications of the ACM No. 10 pp. 95-103 (October 2011), the entire disclosure of which is incorporated herein by reference. In this embodiment, the network is trained to generate outputs in which 87.5% or more of the output values are zeros thereby enabling a reduction in subsequent computations and power requirements. Inference module 12 may include a pair of submodules 16, 18. It should be again understood that submodules 16, 18 are characterized herein by their functional relationship and the use of the term submodules does not necessarily imply a particular physical relationship on a chip or circuit board.

Figure 2:
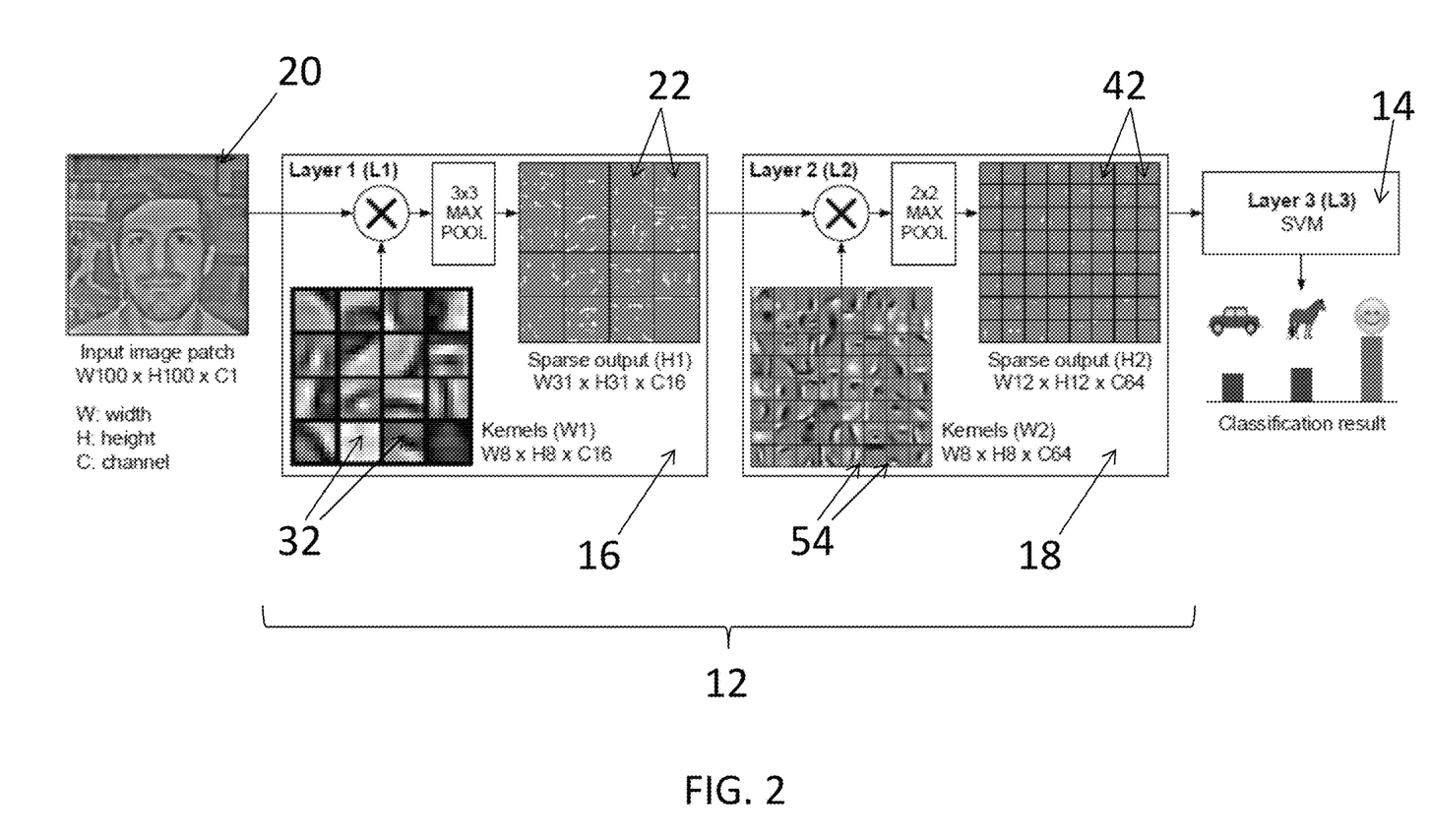
FIG. 2 is a diagrammatic view of the operation of the processor of FIG. 1.
Figure 3:
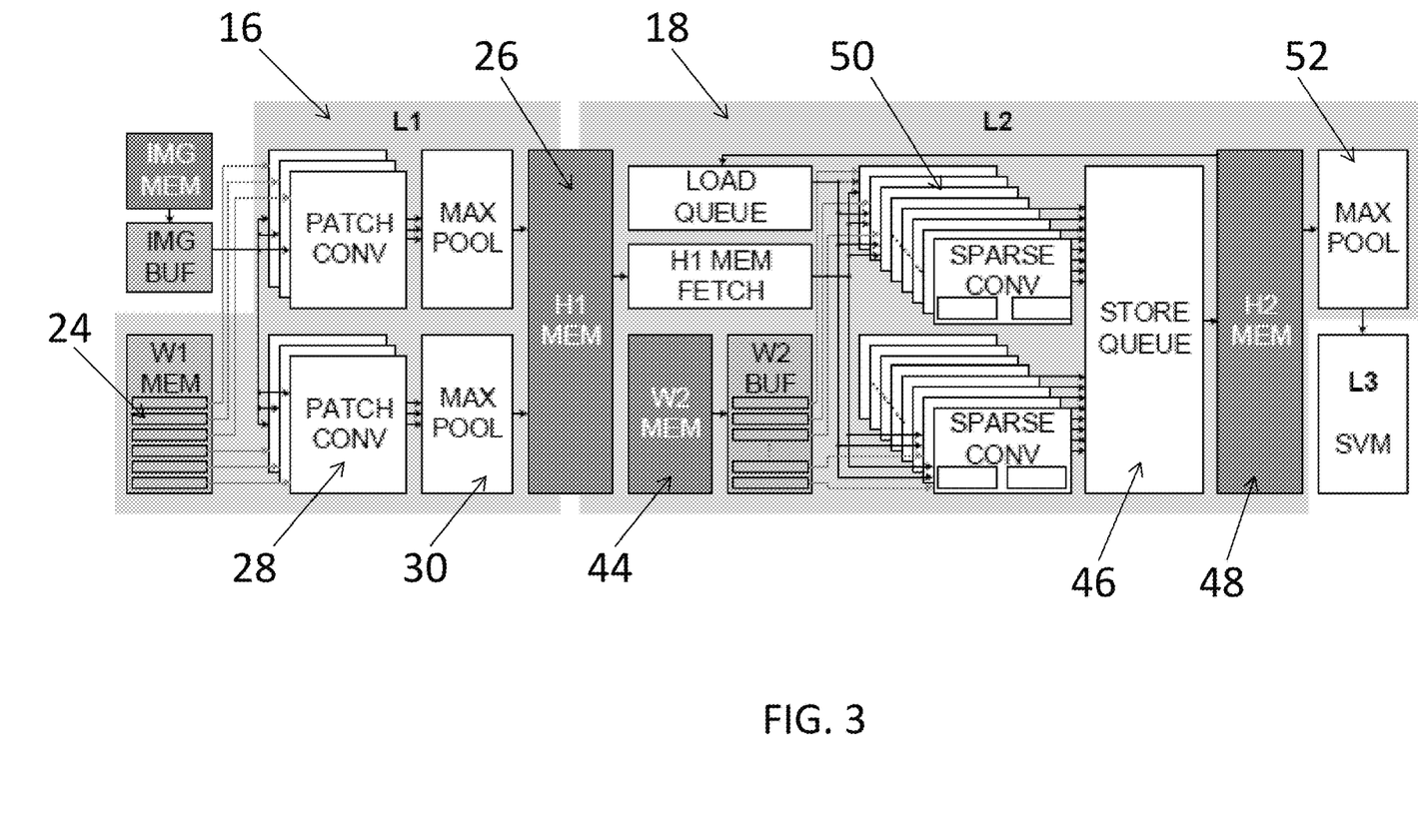
FIG. 3 is a detailed schematic drawing of an information processor in accordance with one embodiment of the present teachings.

Submodule 16 is provided to resolve the input into one or more intermediate sparse representations of the input. Referring to FIG. 2, in one embodiment the input may comprise a single channel of input or a single input image 20 that is represented by a two-dimensional array of picture elements or pixels. In the illustrated embodiment, the image 20 is a 10000 pixel image having one hundred (100) rows and one hundred (100) columns. Submodule 16 may be configured to resolve the input image 20 into sixteen (16) channels of output or intermediate sparse representations 22 of the input. Each intermediate sparse representation 22 comprises a two-dimensional data structure with a plurality of rows and a plurality of columns defining cells having values disposed therein. In one constructed embodiment, each intermediate sparse representation 22 has thirty-one (31) rows and thirty-one (31) columns. Referring now to FIG. 3, submodule 16 may include memories 24, 26, a plurality of convolvers 28, and one or more pooling modules 30.

Memory 24 is provided for storage of convolution kernels (i.e., the set of weights applied to an individual input element (e.g., a pixel) of an input and to surrounding elements (e.g., surrounding pixels) in order to derive an output corresponding to the individual input element) that are applied by convolvers 28 to the input. Each of the convolution kernels applied by convolvers 28 to the input may comprise a two-dimensional data structure having a plurality of rows and a plurality of columns defining cells having values disposed therein. Referring to FIG. 2, in one constructed embodiment, convolvers 28 apply sixteen (16) different kernels 32 each of which may comprise an 8×8 array of cells. Referring again to FIG. 3, memory 26 is provided for storage of the intermediate sparse representations generated from the input by submodule 16. Memories 24, 26 may comprises conventional forms of memory including registers and static random access memories (SRAMs). In accordance with one aspect of the disclosure, at least memory 24 may include latches for more compact storage because memory 24 is not updated every clock cycle.

Figure 4:
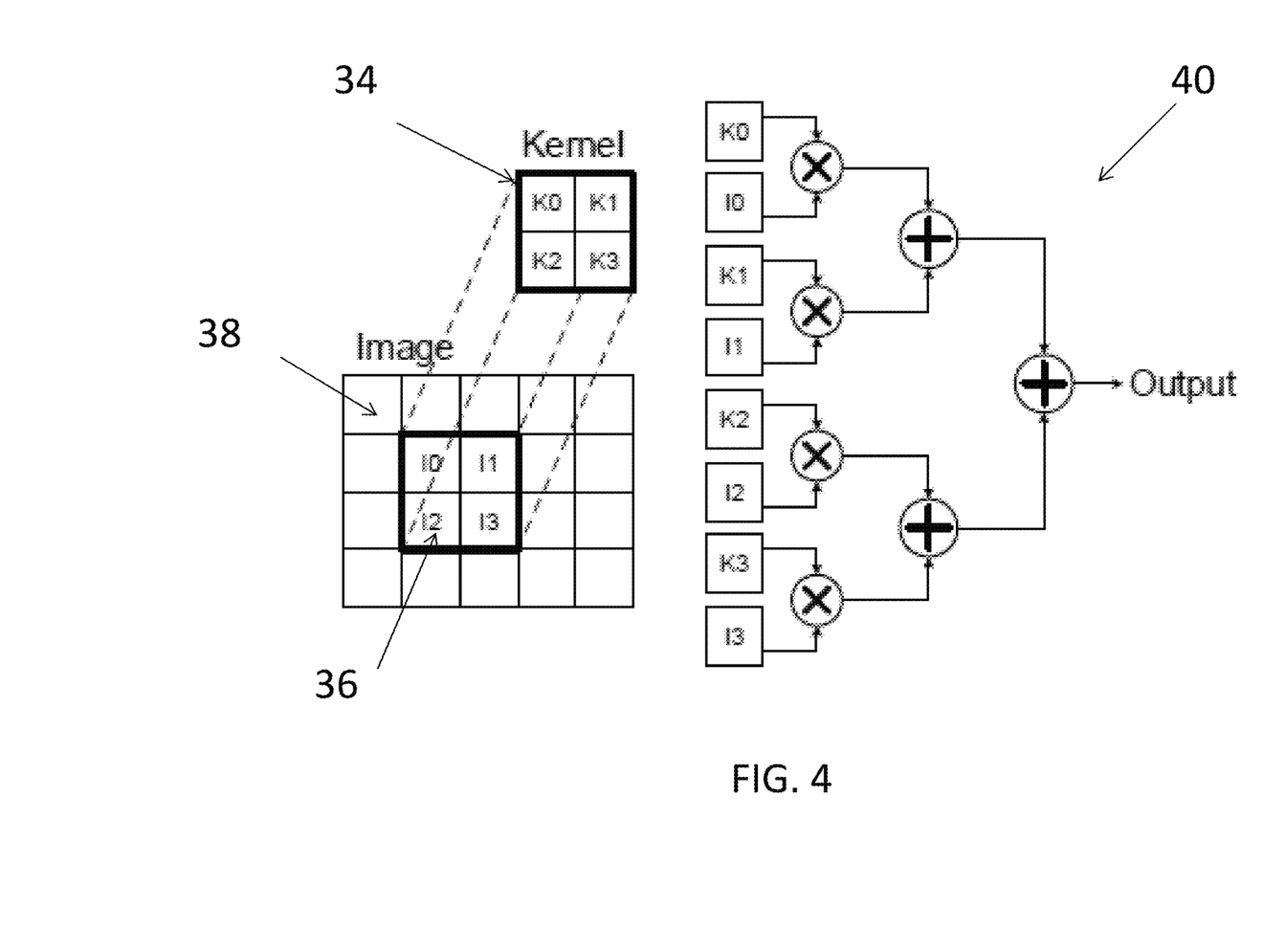
FIG. 4 is a diagrammatic view of the operation of a patch convolver.
Figure 5:
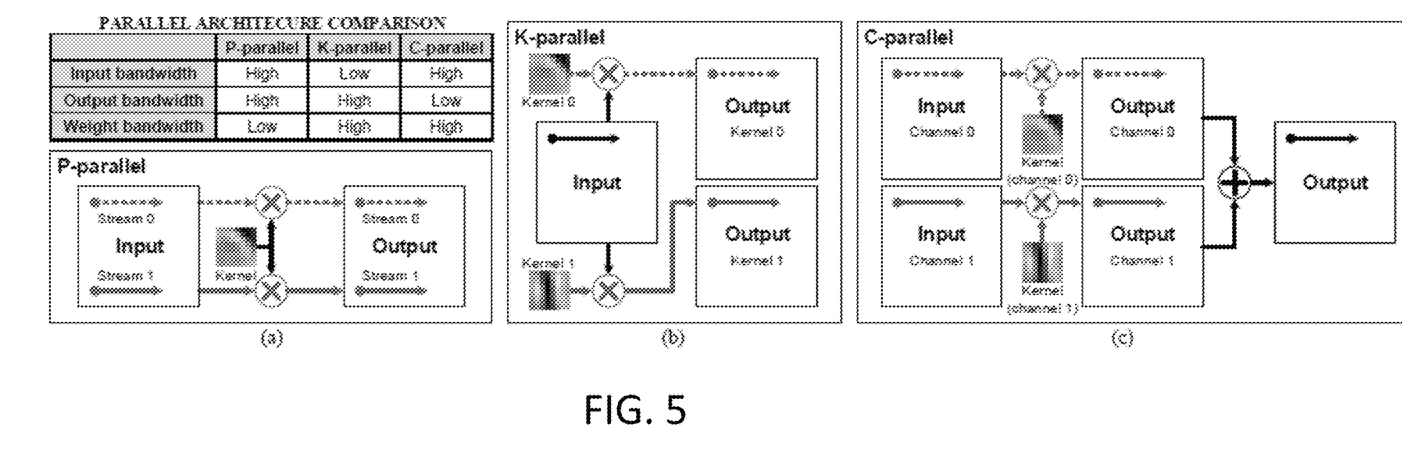
FIG. 5 is a diagrammatic view of the several alternative parallel architectures.

Convolvers 28 are configured to apply one or more convolution kernels 32 to the input in order to generate one or more sparse representations of the input. Convolvers 28 may comprise patch convolvers that apply a two dimensional convolution kernel 32 to a corresponding element of the input such as a patch of pixels of an input image. Referring to FIG. 4, an exemplary 2×2 patch convolver is illustrated in which the value of each cell in a 2×2 convolution kernel 34 is multiplied (or weighted) against a corresponding 2×2 cell portion 36 of the input 38 to generate a plurality of outputs 40 which are then summed to generate a final output. In one constructed embodiment, each convolver 28 comprises an 8×8 patch convolver configured to apply an 8×8 convolution kernel 32 to a portion of the input. Referring again to FIG. 3, in accordance with one aspect of the disclosure, a plurality of convolvers 28 act in parallel. Further, the convolvers 28 are arranged such that they simultaneously apply N1 convolution kernels 32 to each of N2 portions of the input wherein N1 and N2 are greater than one and, in the disclosed embodiment, wherein N2 is greater than N1. In the illustrated embodiment N1=2 and N2=3 such that a first group of three 8×8 patch convolvers 28 applies one convolution kernel 32 to three different portions of the input and a second group of three 8×8 patch convolvers 28 applies another convolution kernel 32 to the same three portions of the input. Referring to FIG. 5, architectures can be created that apply parallelism to dimensions associated with (a) the input ("P-parallel" or "pixel-parallel") by simultaneously applying a convolution kernel to multiple input streams, (b) the convolution kernel ("K-parallel" or "kernel-parallel") by simultaneously applying multiple convolution kernels against a single input stream or (c) the channel ("C-parallel" or "channel-parallel") by simultaneously applying multiple kernels against multiple input channels and summing the outputs. Referring again to FIG. 3, the convolvers 28 in submodule 16 are arranged in a 3×P-parallel and 2×K parallel architecture. As noted above, in one embodiment, submodule 16 is configured to resolve the input image into sixteen (16) channels of output or intermediate sparse representations of the input. Therefore, convolvers 28 are configured to apply sixteen (16) different convolution kernels 32 to the input. Because convolvers 28 are configured in the illustrated embodiment to simultaneously apply two (2) convolution kernels 32 to the input, eight (8) operations must be performed to complete the sixteen (16) channels of output or intermediate sparse representations of the input.

Figure 6:
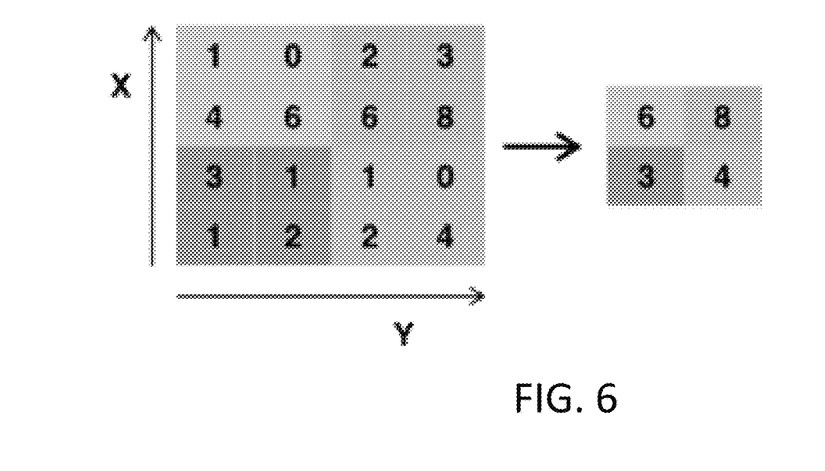
FIG. 6 is a diagrammatic view of a pooling operation.

Pooling modules 30 are provided to reduce the size of the representation to further reduce computations in the artificial neural network implemented in inference module 12. Pooling modules 30 may be configured to perform several steps. Pooling modules 30 may be configured to first combine the outputs from each convolver 28 applying the same convolution kernel 32 into a two dimensional data structure having a plurality of cells each having a value. Modules 30 may then partition the data structure into a plurality of partitions with each partition including a plurality of cells. In one constructed embodiment, modules 30 are configured to partition the data structure into 3×3 partitions (i.e., three rows and three columns for a total of nine cells). Module 30 may then generate an output value for each partition responsive to the values in the cells in each partition and combine the output values to form the interim sparse representation. Module 30 may generate the output values based on various characteristics relating to the values in a given partition. In one constructed embodiment, modules 30 are configured to determine the maximum value among the cells in each partition. Referring to FIG. 6, an exemplary max pooling operation is illustrated in which a 4×4 data structure is partitioned into four 2×2 partitions and the maximum value for each partition is output to generate a condensed representation of the data. It should be understood that pooling could be done based on other characteristics of the values in each partition including, for example, averaging.

Submodule 18 is provided to resolve the intermediate sparse representations of the input into one or more final sparse representations 42 of the input 20. Referring to FIG. 2, in one embodiment, submodule 18 may be configured to resolve the interim sparse representation 22 into sixty-four (64) channels of output or final sparse representations 42 of the input 20. Each final sparse representation 42 may again comprise a two-dimensional data structure with a plurality of rows and a plurality of columns defining cells having values disposed therein. In the illustrated embodiment, each final sparse representation 42 has twelve (12) rows and twelve (12) columns. Referring again to FIG. 3, submodule 18 may include memories 44, 46, 48, a plurality of convolvers 50, and one or more pooling modules 52.

Memory 44 is provided for storage of another set of convolution kernels that are applied by convolvers 50 to the interim sparse representations 22. The convolution kernels applied by convolvers 50 to the interim sparse representations 22 may again each comprise a two-dimensional data structure having a plurality of rows and a plurality of columns defining cells having values disposed therein.

Referring to FIG. 2, in one constructed embodiment, convolvers 50 apply sixty-four (64) different kernels 54 each of which may comprise an 8×8 array of cells. Referring again to FIG. 3, memories 46, 48 are provided for temporary and final storage of the final sparse representations 42. Memories 44, 46, 48 may comprise conventional forms of memory including registers and SRAMs. In accordance with one aspect of the disclosure, at least memories 44, 46 may include latches as opposed to registers for more compact storage because memories 44, 46 are not updated every clock cycle. Because memories 24, 44 and the interface buffers for memories 26, 48, are relatively infrequently updated, dynamic clock gating may be applied to these memories to turn off the clock input and realize about 47% savings in power.

Figure 7A:
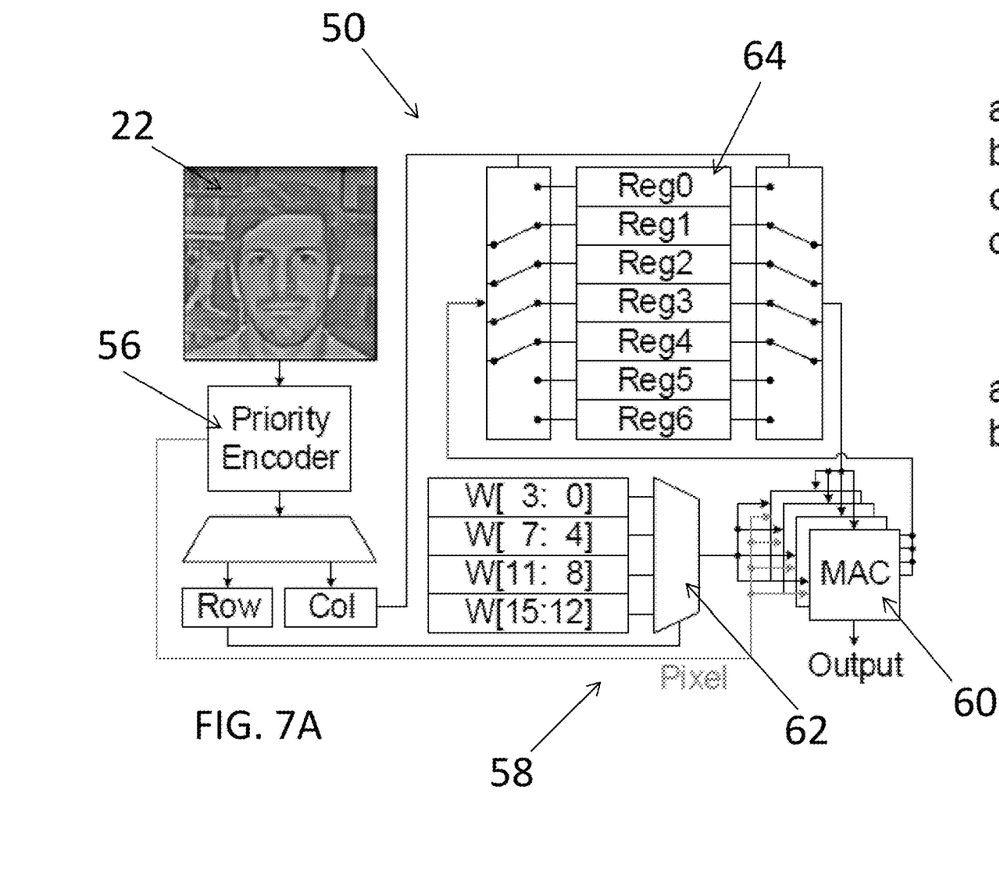
FIGS. 7A-B are diagrammatic views of the structure and operation of a sparse convolver in accordance with one embodiment of the present teachings.
Figure 7B:
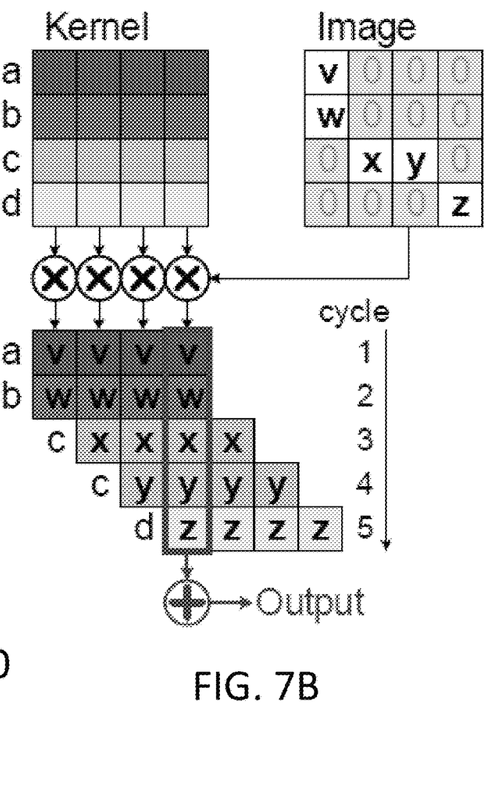

Convolvers 50 are configured to apply one or more convolution kernels 54 to the interim sparse representations 22 in order to generate final sparse representations 42 of the input. In accordance with one aspect of the teachings disclosed herein, convolvers 50 comprise sparse convolvers that realize a sparsity-proportional workload reduction. In particular, and with referenced to FIGS. 7A and 7B illustrating the structure and operation, respectively, of an exemplary sparse convolver, convolvers 50 may each comprise a priority encoder 56 that filters sparse data from the interim sparse representation 22 and a line convolver 58 that applies only a selected row of a two-dimensional convolution kernel 54 to a corresponding cell of the interim sparse representation 22. Encoder 56 filters sparse data from the interim sparse representation 22 before line convolver 58 acts on that data. Encoder 56 scans a stream of inputs and forward only those inputs meeting a predetermined condition. In particular, encoder 56 may be configured to forward data to a multiply-accumulator (MAC) 60 only from cells having non-zero values to eliminate redundant operations. Line convolver 58 uses the row and column address for any cell having a non-zero value in order to determine which row of a convolution kernel 54 to apply to the cell and to align the output data. As shown in the exemplary embodiment in FIGS. 7A and 7B, a k pixel line convolver can achieve k-way parallelism using k multipliers, and a (2k−1)-entry register bank with a k:(2k−1) selector for data alignment. The row address of the cell may be used in a multiplexer 62 to select from among multiple rows of the convolution kernel 54 with the selected row supplied to the MAC 60 and applied to the selected cell from the interim sparse representation 22. The column address may be used by a selector 64 that outputs a value to the MAC 60 used to align the output data. As an example, referring to FIG. 7B, the selector 64 will be set to 0 for the convolution with input pixel "v" because its column address is 0; and the selector 64 will be sent to 1 for the convolution with input pixel "x" because it column address is 1. Because of the predictable dependency between consecutive line convolutions, selector 64 is able to resolve the memory contention between consecutive line convolutions. Selector 64 only needs to access a small one dimensional line of temporary outputs as opposed to a large two-dimensional block of outputs. With the system trained for a target sparsity of 87.5%, an eight element sparse convolver 50 will match the throughput of an 8×8 patch convolver, but will require 3.3 times less power and 1.74 times less area.

Referring again to FIG. 3, in accordance with one aspect of the disclosure, a plurality of convolvers 50 again act in parallel. Further, the convolvers 50 are arranged such that they simultaneously apply N3 convolution kernels 54 to each of N4 portions of the interim sparse representation wherein at least N3 is greater than one and N3 is greater than N4. In the illustrated embodiment N3=16 and N4=2 such that a first group of sixteen (16) sparse convolvers 50 each apply one of sixteen different convolution kernels 54 to one portion of the interim sparse representation 22 and a second group of sixteen sparse convolvers 50 each apply one of the sixteen convolution kernels 54 to a second portion of the interim sparse representation 22. Because the interim sparse representation 22 is relative sparse (and lacks density) unlike the original input image 20, this parallel architecture is intended to take advantage of parallelism along a non-sparse dimensions to eliminate stalling by applying a greater degree of parallelism to the application of convolution kernels 54. Convolvers 50 in submodule 18 are therefore arranged in a 16× K-parallel and 2× P-parallel architecture. As noted above, in one embodiment, submodule 18 is configured to resolve the interim sparse representation image 22 into sixty-four (64) channels of output or final sparse representations 42 of the input. Therefore, convolvers 50 are configured to apply sixty-four (64) different convolution kernels 54 to the interim sparse representations 22. Because convolvers 50 are configured in the illustrated embodiment to simultaneously apply sixteen (16) convolution kernels 54 to the interim sparse representations 22, four (4) operations must be performed to realize the sixty-four (64) channels of output or final sparse representations 42 of the input.

Pooling modules 52 are again provided to reduce the size of the representation to further reduce computations in the artificial neural network implemented in inference module 12. Pooling modules 52 may again be configured to combine the outputs of each convolver 50 that applies the same convolution kernel 54 into a two dimensional data structure having a plurality of cells each having a value. Modules 50 may then partition the data structure into a plurality of partitions with each partition including a plurality of cells. In one constructed embodiment, modules 52 are configured to partition the data structure into 2×2 partitions (i.e., two rows and two columns for a total of four cells) Module 52 may then generate an output value for each partition responsive to the values in the cells in each partition and combine the output values to form the interim spare representation. Module 52 may generate the output values based on various characteristics relating to the values in a given partition. In one constructed embodiment, modules 52 are again configured to determine the maximum value among the cells in each partition.

Referring again to FIG. 2, classification module 14 is configured to classify the information in the input based on the extracted subset of data found in the final sparse representation 42 of the input. Module 14 may include a support vector machine. The support vector machine may classify information in the original input responsive to summed values from a plurality of final sparse representations 42 output by inference module 12.

Figure 8:
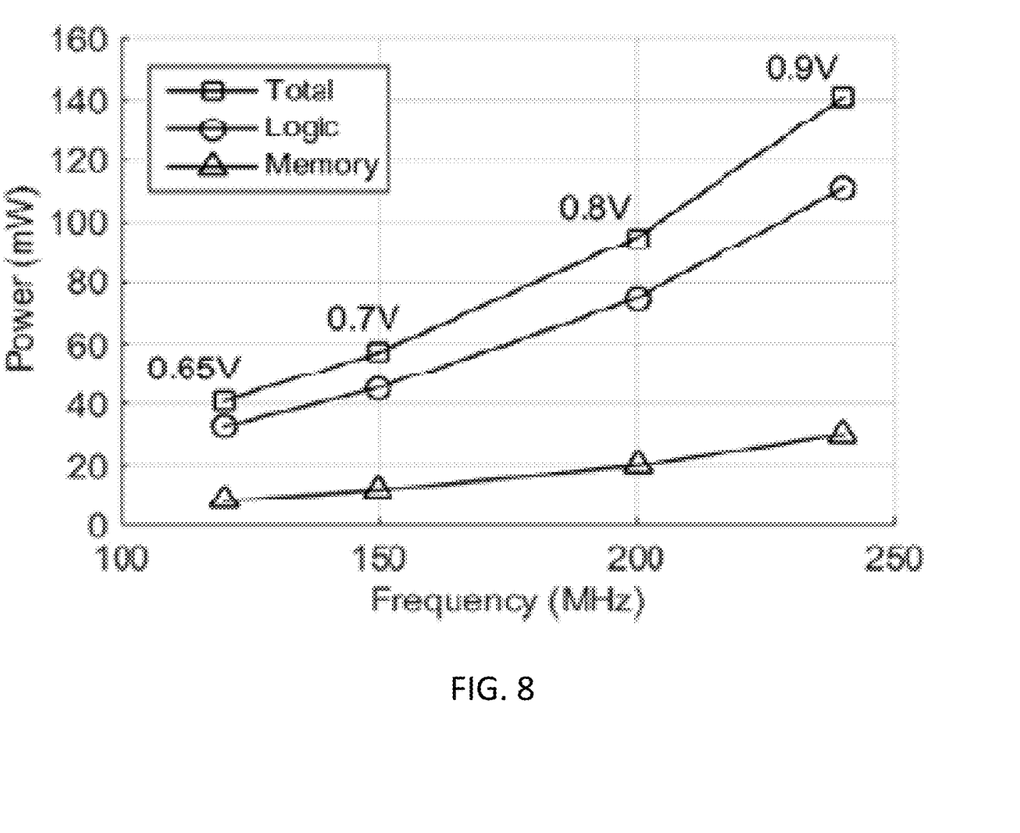
FIG. 8 is a graph illustrating the measured power consumption at predetermined frequencies and voltage levels of a hardware prototype of an information processor in accordance with one embodiment of the present teachings.
Figure 9:
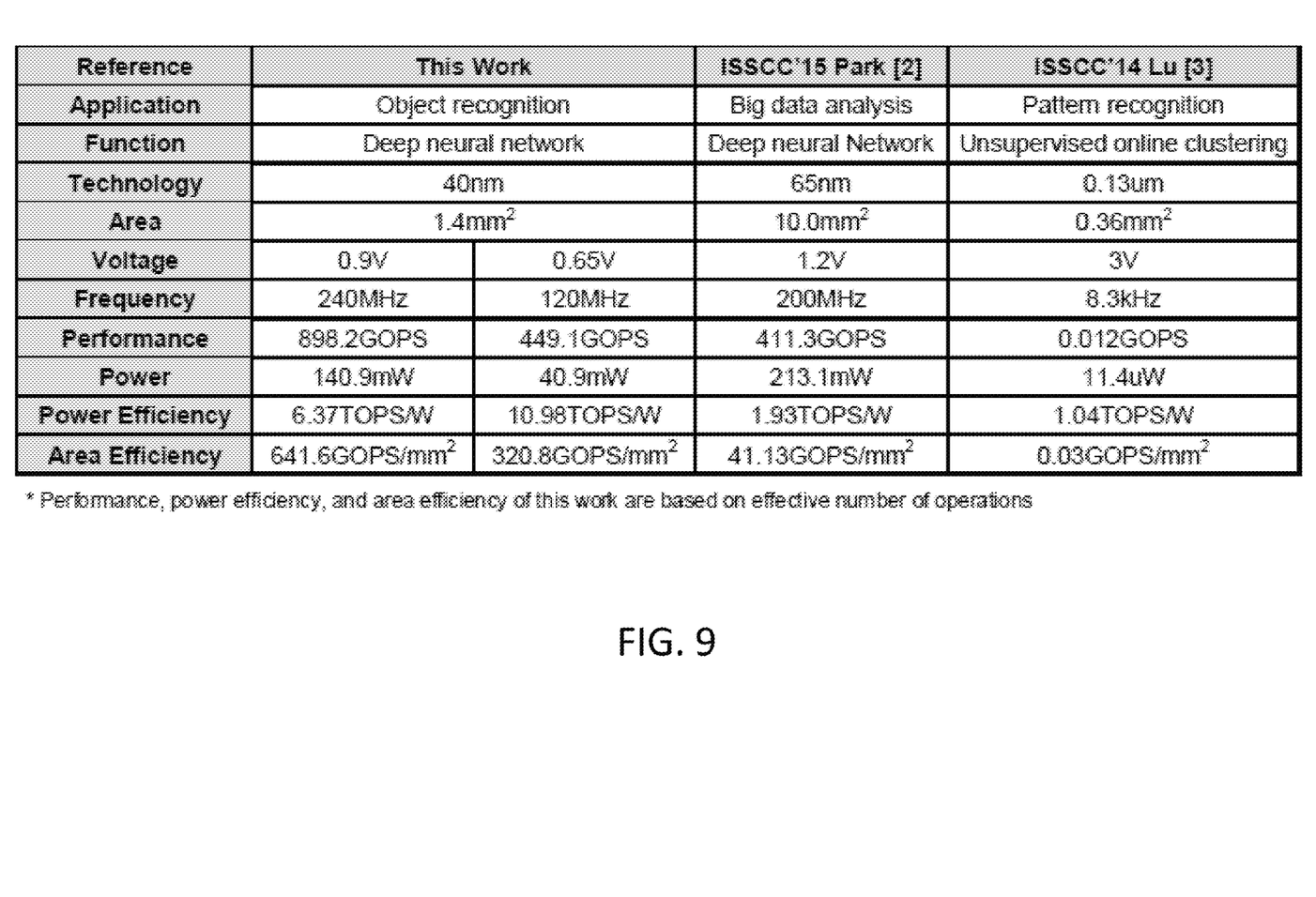
FIG. 9 is a table comparing characteristics of an information processor in accordance with one embodiment of the present teachings to prior information processor designs.

In a constructed embodiment, processor 10 has been configured for use in facial recognition. When tested with the Caltech 101 dataset (see Fei-Fei et al, "Learning Generative Visual Models from Few Training Examples: An Incremental Bayesian Approach Tested on 101 Object Categories," CVPR Workshop on Generative-Model Based Vision (2004)) to identify faces (with 50% faces, 50% non-faces, 434 training images and 434 testing images), the processor achieves an 89% classification accuracy. Referring to FIG. 8, with a 0.9 V supply and a 240 MHz frequency, the processor's measured throughput at room temperature is 96.4 M pixels/s while consuming 140.9 mW of power. The majority of the workload (76 M effective operations per 100×100 input patch with an operation defined as an 8b multiplication or a 16b addition) is performed in submodule 18 with a lesser amount (18 M operations) performed in submodule 16. The processor achieves an effective performance of 898.2 GOPS (giga operations per second). The processor demonstrates a competitive power efficiency of 6.377 TOPS/W and area efficiency of 641.6 GOPS/mm$^2$ which are 3.3 times and 15.6 times higher than the state of the art non-sparse deep learning processor disclosed in S. Park et al., "A 1.93 TOPS/W Scalable Deep Learning/Inference Processor With Tetra-Parallel MIMD Architecture for Big-Data Applications" IEEE International Solid-State Circuits Conference (February 2015) as summarized in the table shown in FIG. 9. With a scaled supply voltage of 0.65 V, the efficiency further improves to 10.98 TOPS/W.

Additional details relating to the architecture and methodologies described herein are set forth in Appendix A: A 1.40 mm$^2$ 141 mW 898 GOPS Sparse Neuromorphic Processor in 40 nm CMOS by Phil Knag, Chester Liu, and Zhengya Zhang which is attached hereto and forms an integral part of this application.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Further, the term "electrically connected" and the variations thereof is intended to encompass both wireless electrical connections and electrical connections made via one or more wires, cables, or conductors (wired connections). Other terms are to be construed using their broadest reasonable meaning unless they are used in a context that requires a different interpretation.

What is claimed is:

1. An information processor, comprising:
 an inference module configured to extract a subset of data from information contained in an input; and,
 a classification module configured to classify the information in the input based on the extracted subset of data
 wherein the inference module includes
  a first submodule having a first plurality of convolvers acting in parallel to apply each of N1 convolution kernels to each of N2 portions of the input, wherein N1 and N2 are each greater than one, the first submodule generating at least one interim sparse representation of the input; and
  a second submodule having a second plurality of convolvers acting in parallel to apply each of N3 convolution kernels to each of N4 portions of the at least one interim sparse representation, wherein N3 is greater than one and greater than N4, the second submodule generating at least one final sparse representation of the input containing the extracted subset of data, wherein the second submodule includes an encoder configured to filter sparse data from the at least one interim sparse representation before the application of the N3 convolutional kernels, and the N4 portions of the at least one interim sparse representation comprise N4 portions of the filtered at least one interim sparse representation.

2. The information processor of claim 1 wherein the first submodule includes a pooling module configured to combine the outputs of each for the first plurality of convolvers applying the same convolution kernel into a two dimensional data structure having a plurality of cells each having a value, partition the data structure into a plurality of partitions, each partition including a plurality of cells, generate an output value for each partition responsive to the values in the cells in each partition, and combine the output values to form the interim sparse representation.

3. The information processor of claim 2 wherein the pooling module is further configured, in generating an output value, to determine the maximum value among the cells in each partition.

4. The information processor of claim 1 wherein the second submodule includes a pooling module configured to combine the outputs of each of the second plurality of convolvers applying the same convolution kernel into a two dimensional data structure having a plurality of cells each having a value, partition the data structure into a plurality of partitions, each partition including a plurality of cells, generate an output value for each partition responsive to the values in the cells in each partition, and combine the output values to form the final sparse representation.

5. The information processor of claim 4 wherein the pooling module is further configured, in generating an output value, to determine the maximum value among the cells in each partition.

6. The information processor of claim 1 wherein the input comprises an image and each of the N1 convolution kernels comprises a two dimensional data structure including a plurality of cells and each of the first plurality of convolvers applies each cell of a corresponding convolution kernel of the N1 convolution kernels to a corresponding pixel in the image.

7. The information processor of claim 1 wherein the interim sparse representation comprises a two dimensional data structure having a plurality of cells each having a value and the encoder is configured to cause the second plurality of convolvers to apply the N3 convolution kernels only to cells in the N4 portions of the at least one interim sparse representation that meet a predetermined condition.

8. The information processor of claim 1 wherein the interim sparse representation comprises a two dimensional data structure having a plurality of cells and each of the N3 convolution kernels comprises a two dimensional data structure including a plurality of cells and each of the second plurality of convolvers applies a row of cells of a corresponding convolution kernel to a first individual cell of the interim sparse representation to obtain a first plurality of intermediate values, the row selected based on a row address of the first individual cell of the interim sparse representation.

9. The information processor of claim 8 wherein each of the second plurality of convolvers includes a selector configured to align a corresponding first plurality of intermediate values with a second plurality of intermediate values corresponding to a second individual cell of the interim sparse representation for inclusion in the final sparse representation responsive to a column address of the first individual cell of the interim sparse representation.

10. The information processor of claim 1 wherein the classification module comprises a support vector machine.

11. The information processor of claim 10 wherein the support vector machines classifies the information in the input responsive to summed values from a plurality of final sparse representations output by the inference module.

12. The information processor of claim 1 wherein the input comprises an image and the information comprise an object in the image.

13. An information processor, comprising:
an inference module configured to extract a subset of data from information contained in an input; and,
a classification module configured to classify the information in the input based on the extracted subset of data
wherein the inference module includes
a first submodule having a first plurality of convolvers acting in parallel to apply each of N1 convolution kernels to each of N2 portions of the input, wherein N1 and N2 are each greater than one, the first submodule generating at least one interim sparse representation of the input, the interim sparse representation comprising a two dimensional data structure having a plurality of cells; and
a second submodule having a second plurality of convolvers acting in parallel to apply each of N3 convolution kernels to each of N4 portions of the at least one interim sparse representation, wherein N3 is greater than one and each of the N3 convolution kernels comprises a two dimensional data structure including a plurality of cells, the second submodule generating at least one final sparse representation of the input containing the extracted subset of data, each of the second plurality of convolvers applying a row of cells of a corresponding convolution kernel to a first individual cell of the interim sparse representation to obtain a first plurality of intermediate values, the row selected based on a row address of the first individual cell of the interim sparse representation, and further wherein the second submodule includes an encoder configured to filter sparse data from the at least one interim sparse representation before the application of the N3 convolutional kernels, and the N4 portions of the at least one interim sparse representation comprise N4 portions of the filtered at least one interim sparse representation.

14. The information processor of claim 13 wherein each of the second plurality of convolvers includes a selector configured to align a corresponding first plurality of intermediate values with a second plurality of intermediate values corresponding to a second individual cell of the interim sparse representation for inclusion in the final sparse representation responsive to a column address of the first individual cell of the interim sparse representation.

15. The information processor of claim 13 wherein the encoder is configured to cause the second plurality of convolvers to apply the N3 convolution kernels only to cells in the N4 portions of the at least one interim sparse representation that meet a predetermined condition.

16. The information processor of claim 13 wherein N3 is greater than N4.

17. The information processor of claim 16 wherein N2 is greater than N1.

18. The information processor of claim 13 wherein the input comprises an image and each of the N1 convolution kernels comprises a two dimensional data structure including a plurality of cells and each of the first plurality of convolvers applies each cell of a corresponding convolution kernel of the N1 convolution kernels to a corresponding pixel in the image.

19. The information processor of claim 13 wherein the classification module comprises a support vector machine.

20. The information processor of claim 19 wherein the support vector machines classifies the information in the input responsive to summed values from a plurality of final sparse representations output by the inference module.

* * * * *